(12) United States Patent
Byun et al.

(10) Patent No.: US 10,115,957 B2
(45) Date of Patent: Oct. 30, 2018

(54) SECONDARY BATTERY

(71) Applicant: SAMSUNG SDI CO., LTD., Yongin-si, Gyeonggi-do (KR)

(72) Inventors: Sangwon Byun, Yongin-si (KR); Inhyun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 279 days.

(21) Appl. No.: 14/984,803

(22) Filed: Dec. 30, 2015

(65) Prior Publication Data
US 2017/0054135 A1 Feb. 23, 2017

(30) Foreign Application Priority Data

Aug. 17, 2015 (KR) .................. 10-2015-0115525

(51) Int. Cl.
*H01M 2/34* (2006.01)
*H01M 2/30* (2006.01)

(52) U.S. Cl.
CPC ............ *H01M 2/345* (2013.01); *H01M 2/30* (2013.01); *H01M 2/348* (2013.01); *H01M 2200/103* (2013.01); *H01M 2200/20* (2013.01)

(58) Field of Classification Search
CPC ......... H01M 2/345; H01M 2/348; H01M 2/30
See application file for complete search history.

(56) References Cited

U.S. PATENT DOCUMENTS

| | | | |
|---|---|---|---|
| 2012/0263976 A1* | 10/2012 | Byun | H01M 2/266 429/7 |
| 2013/0011703 A1 | 1/2013 | Kim et al. | |
| 2013/0196179 A1 | 8/2013 | Han et al. | |
| 2014/0377601 A1 | 12/2014 | Kim | |

FOREIGN PATENT DOCUMENTS

| | | |
|---|---|---|
| KR | 2013-0006280 A | 1/2013 |
| KR | 2013-0089134 A | 8/2013 |
| KR | 2014-0147351 A | 12/2014 |

* cited by examiner

*Primary Examiner* — Jonathan G Jelsma
(74) *Attorney, Agent, or Firm* — Lewis Roca Rothgerber Christie LLP

(57) ABSTRACT

A secondary battery includes an electrode assembly including a first electrode plate, a second electrode plate and a separator between the first electrode plate and the second electrode plate; a case accommodating the electrode assembly and having an opening; a cap plate sealing the opening of the case, the cap plate electrically connected to the second electrode plate and having a short-circuit hole; an inversion plate arranged in the short-circuit hole; a first terminal plate electrically connected to the first electrode plate and spaced apart from the cap plate; and a fuse part comprising a first fuse and a second fuse spaced apart from each other in the first terminal plate.

10 Claims, 5 Drawing Sheets

SECONDARY BATTERY

CROSS-REFERENCE TO RELATED APPLICATION

This application claims priority to and the benefit of Korean Patent Application No. 10-2015-0115525, filed on Aug. 17, 2015 in the Korean intellectual Property Office, the entire content of which is incorporated herein by reference.

BACKGROUND

1. Field

Aspects of embodiments of the present invention relate to a secondary battery.

2. Description of the Related Art

A rechargeable battery can repeatedly perform charge and discharge, unlike a primary battery which can be charged just once. Low-capacity rechargeable batteries that use single battery cells may be used as power sources for various small portable electronic devices, such as cellular phones, camcorders, or the like. High-power rechargeable batteries that use, for example, tens of battery cells connected to each other in a battery pack, may be used as power sources for a motor drive, such as in electric vehicles, hybrid electric vehicles, or the like.

Rechargeable batteries are manufactured in various shapes, for example, a cylindrical shape and a prismatic shape. A rechargeable battery is typically constructed with an electrode assembly including a positive electrode and a negative electrode with a separator interposed between the positive and negative electrodes, a case accommodating the electrode assembly with an electrolyte, and a cap assembly having an electrode terminal in the case.

Meanwhile, the rechargeable battery may be subjected to ignition and/or explosion due to an increase in the internal pressure of the rechargeable battery when excessive heat is generated due to overcharge and/or when an electrolyte is decomposed. Accordingly, there is a need for a rechargeable battery constructed to have improved safety.

SUMMARY

According to an aspect of embodiments of the present invention, a secondary battery can prevent or substantially prevent an internal pressure of the secondary battery from excessively rising by causing an internal short circuit when the internal pressure of the secondary battery rises and which has stability against external short circuit.

The above and other aspects of the present invention will be described in or be apparent from the following description of some exemplary embodiments.

According to one or more embodiments of the present invention a secondary battery includes: an electrode assembly including a first electrode plate, a second electrode plate and a separator between the first electrode plate and the second electrode plate; a case accommodating the electrode assembly and having an opening; a cap plate sealing the opening of the case, the cap plate electrically connected to the second electrode plate and having a short-circuit hole; an inversion plate arranged in the short-circuit hole; a first terminal plate electrically connected to the first electrode plate and spaced apart from the cap plate; and a fuse part comprising a first fuse and a second fuse spaced apart from each other in the first terminal plate.

The secondary battery may further include a charging/discharging member electrically connected to the first terminal plate between the first fuse and the second fuse.

The secondary battery may further include a first electrode terminal protruding an upper portion of the cap plate and electrically connecting the first electrode plate and the first terminal plate.

The first terminal plate may include a first region extending front one end of the first terminal plate to the first fuse; a second region extending from the first fuse to the second fuse; and a third region extending from the second fuse to an end of the first terminal plate opposite the one end.

The first region of the first terminal plate may face the inversion plate, the second region of the first terminal plate may be connected to the charging/discharging member, and the third region of the first terminal plate may be connected to the first electrode terminal.

The secondary battery may further include an insulation member between the first terminal plate and the cap plate, the insulation member electrically insulating the cap plate from the first terminal plate.

When an internal pressure of the case is greater than a reference pressure, the inversion plate may be inverted and make contact with the first terminal plate to induce a short-circuit current.

The inversion plate may include a round part convexly arranged toward the electrode assembly when the internal pressure is less than the reference pressure, and an edge part fixed to the cap plate.

The secondary battery may further include a second electrode terminal electrically connected to the second electrode plate and protruding to the upper portion of the cap plate.

The secondary battery may further include a first current collector plate electrically connecting the first electrode plate and the first electrode terminal, and a second current collector plate electrically connecting the second electrode plate and the second electrode terminal.

The first fuse and the second fuse may have smaller cross-sectional areas than other regions of the first terminal plate.

As described above, according to an aspect of embodiments of the present invention, the secondary battery can prevent or substantially prevent the internal pressure of the secondary battery from excessively rising by causing an internal short circuit when the internal pressure of the secondary battery rises and has stability against external short circuit.

BRIEF DESCRIPTION OF THE DRAWINGS

The above and other features of the present invention will become more apparent by describing detail some exemplary embodiments thereof with reference to the attached drawings in which.

DETAILED DESCRIPTION

Hereinafter, some examples of embodiments of the invention will be described in detail with reference to the accompanying drawings such that they can easily be made and used by those skilled in the art. Various aspects of embodiments of the present invention may be embodied in many different forms and should not be construed as being limited to the example embodiments set forth herein. As those skilled in the art would realize, the described embodiments may be modified in various different ways, all without departing from the spirit or scope of the present invention. Accordingly, the drawings and description are to be regarded as illustrative in nature and not restrictive.

As used herein, the term "and/or" includes any and all combinations of one or more of the associated listed items. The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that although the terms "first," "second," etc. may be used herein to describe various elements, these elements should not be limited by these terms. These terms are used merely to distinguish one element from another element.

Figure 1:
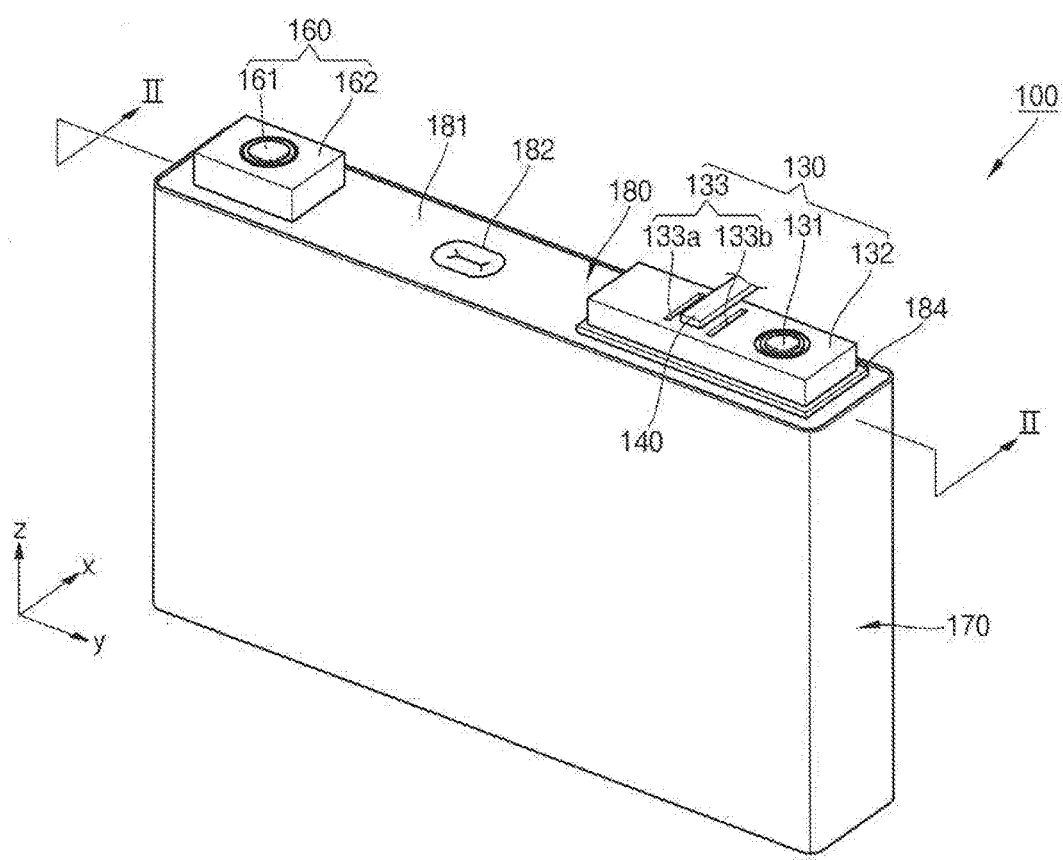
FIG. 1 is a perspective view of a secondary battery according to an embodiment of the present invention.
Figure 2:
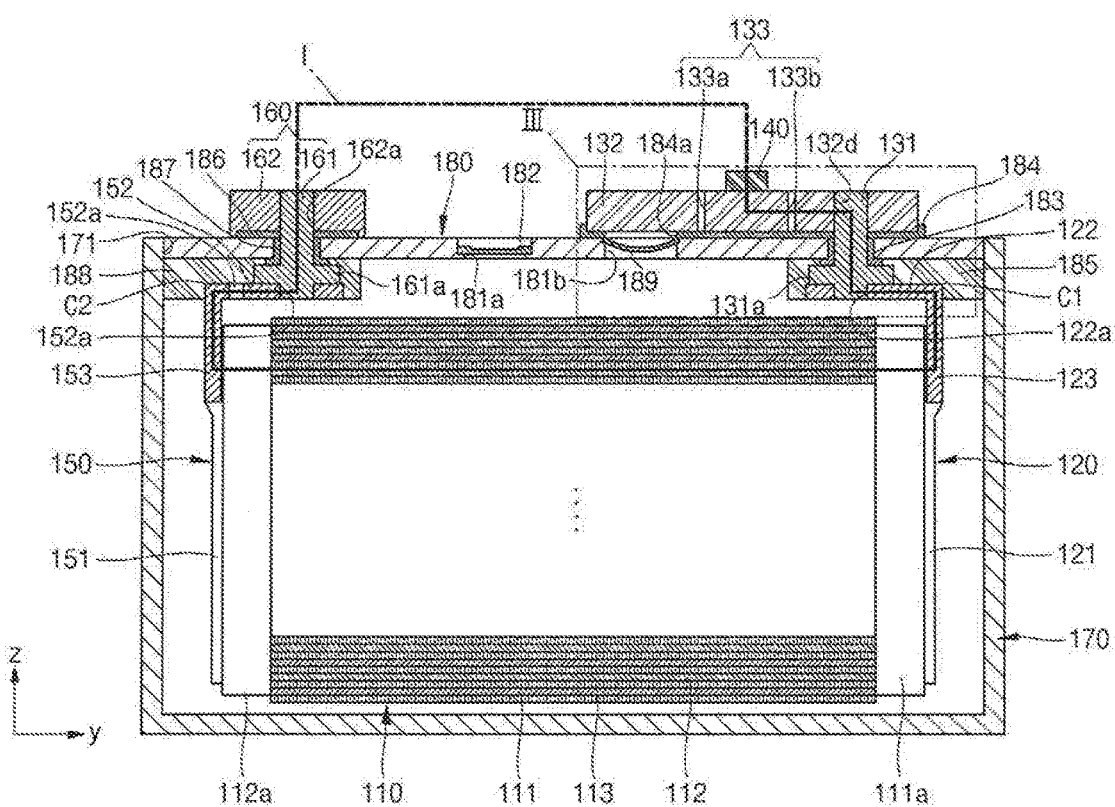
FIG. 2 is a cross-sectional view of the secondary battery of FIG. 1, taken along the line II-II.
Figure 3:
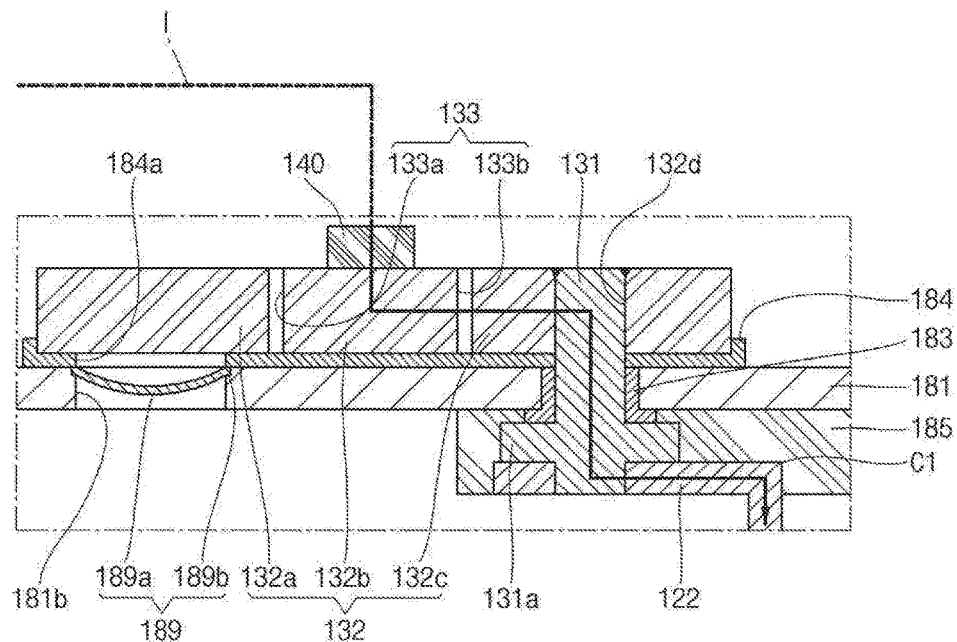
FIG. 3 is an enlarged cross-sectional view of a region III of FIG. 2, illustrating a state in which an inversion plate is not inverted.
Figure 4:
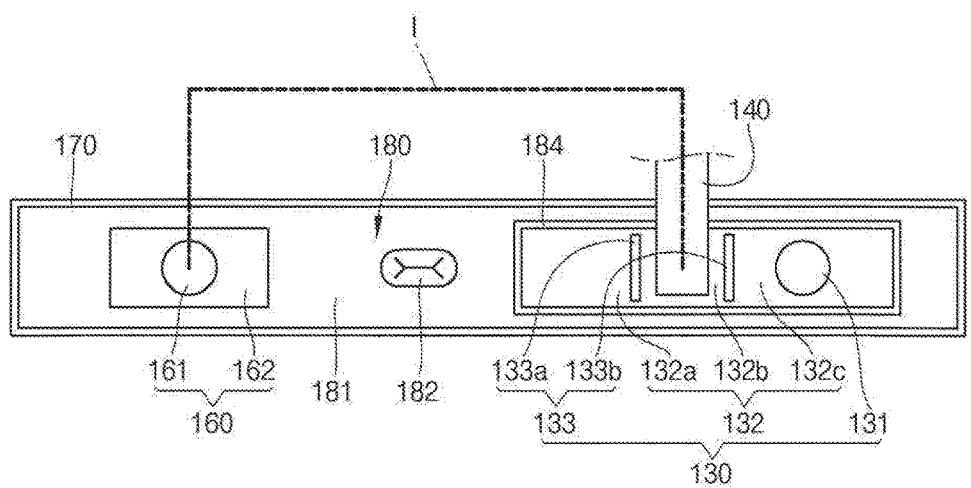
FIG. 4 is a top view illustrating a normal state of a secondary battery according to an embodiment of the present invention.
Figure 5:
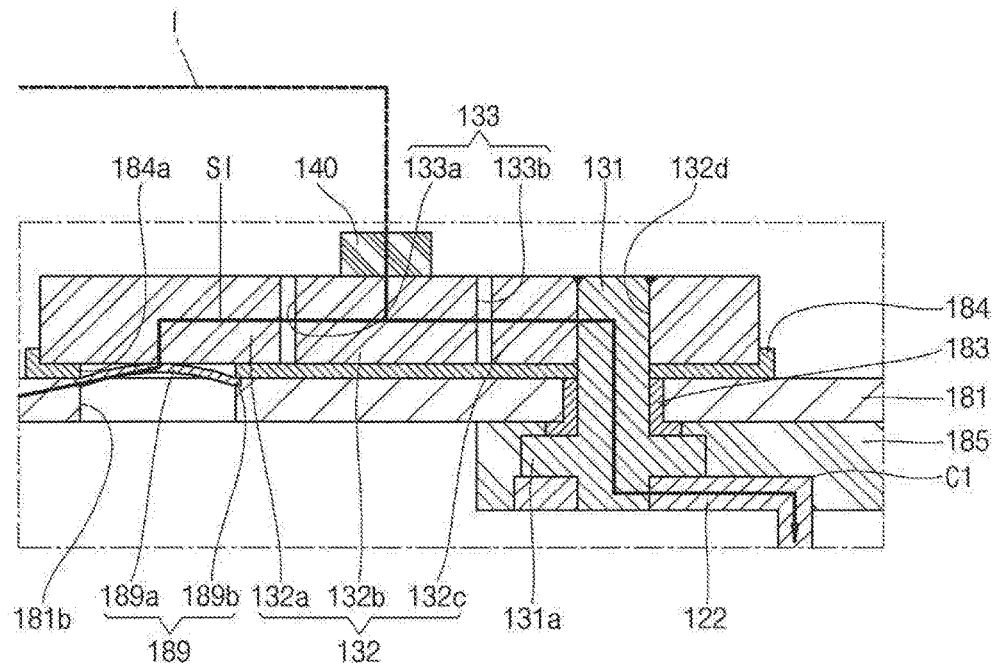
FIG. 5 is a cross-sectional view illustrating the flow of a short-circuit current after the inversion plate shown in FIG. 3 is inverted.
Figure 6:
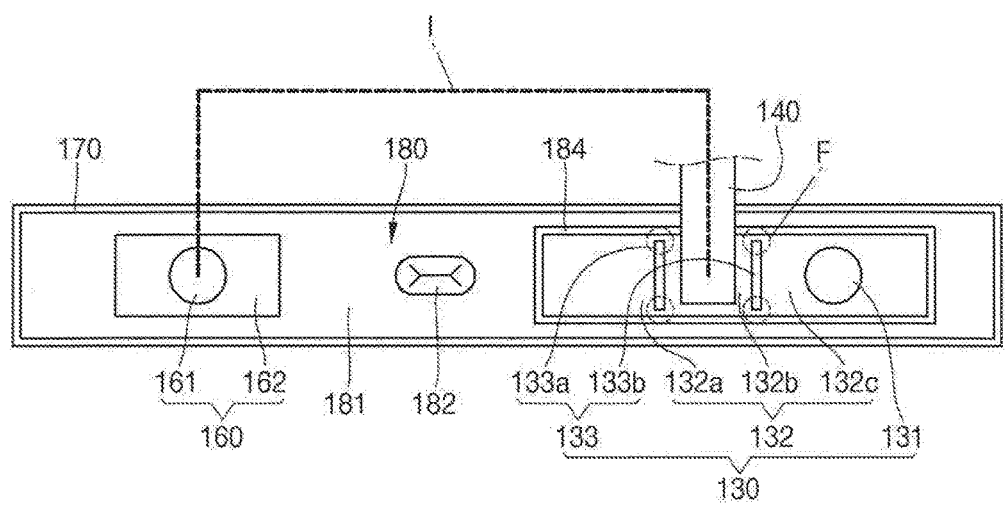
FIG. 6 is a top view illustrating a state in which a short-circuit current of a secondary battery according to an embodiment of the present invention is generated.
Figure 7:
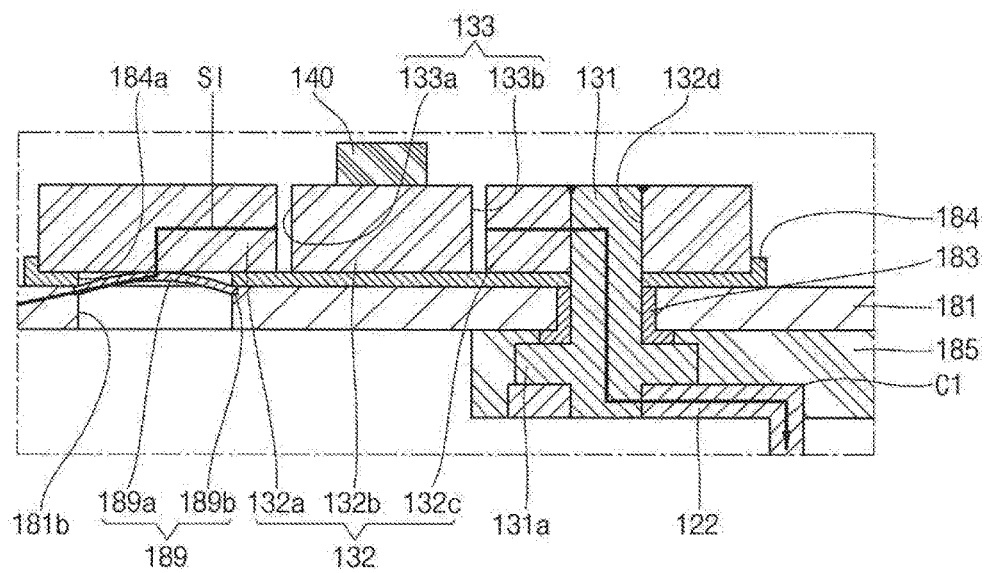
FIG. 7 is a cross-sectional view illustrating the flow of a short-circuit current after a fuse part shown in FIG. 3 is operated.
Figure 8:
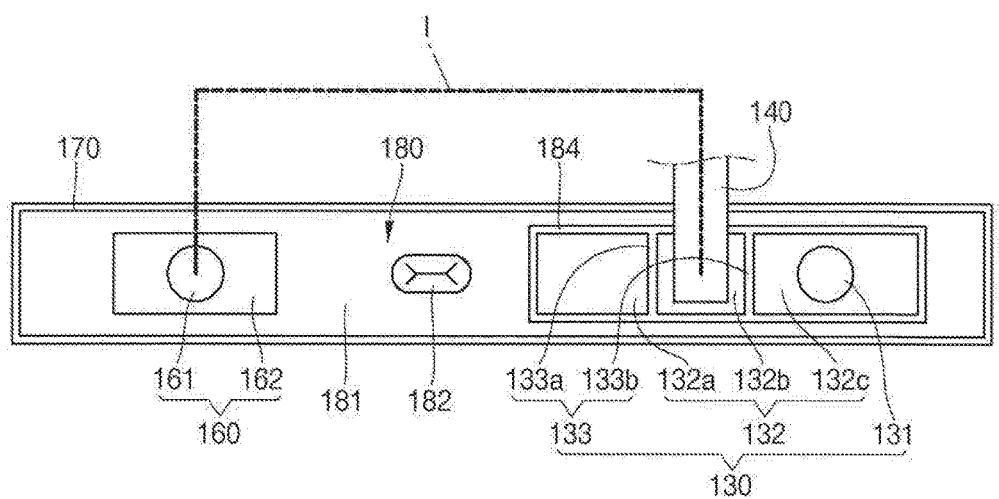
FIG. 8 is a tap view illustrating a state in which the fuse part of the secondary battery according to an embodiment of the present invention is operated.

FIG. 1 is a perspective view of a secondary battery according to an embodiment of the present invention; FIG. 2 is a cross-sectional view of the secondary battery of FIG. 1, taken along the line II-II; FIG. 3 is an enlarged cross-sectional view of a region III of FIG. 2, illustrating a state in which an inversion plate is not inverted; FIG. 4 is a top view illustrating a normal state of a secondary battery according to an embodiment of the present invention; FIG. 5 is a cress-sectional view illustrating the flow of a short-circuit current after the inversion plate shown in FIG. 3 is inverted; FIG. 6 is a top view illustrating a state in which a short-circuit current of a secondary battery according to an embodiment of the present invention is generated; FIG. 7 is a cross-sectional view illustrating the flow of a short-circuit current after a fuse part shown in FIG. 3 is operated; and FIG. 8 is a top view illustrating a state in which the fuse part of the secondary battery according to an embodiment of the present invention is operated.

Referring to FIGS. 1 to 4, a secondary battery 100 according to ah embodiment of the present invention includes an electrode assembly 110, a first current collector plate 120, a first terminal part 130, a charging/discharging member 140, a second current collector plate 150, a second terminal part 160, a case 170, and a cap assembly 180. The secondary battery 100 including a plurality of secondary batteries connected to each other in series, in parallel, or in series/parallel may constitute a large-capacity battery pack outputting high voltage power.

The electrode assembly 110 may be formed by winding or laminating a stack of a first electrode plate 111, a separator 113, and a second electrode plate 112, which are thin films or layers. In one embodiment, the first electrode plate 111 may be a negative electrode, and the second electrode plate 112 may be a positive electrode.

The first electrode plate 111 may include a negative electrode active material layer coated on both surfaces of a negative electrode current collector formed of a conductive metal foil, such as a copper (Cu) foil or a nickel (Ni) foil, for example. A carbon-based material, Si, Sn, tin oxide, a composite tin alloy, a transition metal oxide, lithium metal nitride, lithium metal oxide, etc., may be used as a negative electrode active material of the negative electrode active material layer, but embodiments of the present invention are not limited to the materials of the active material of the negative electrode active material layer disclosed herein. In addition, the first electrode plate 111 includes a first electrode uncoated portion 111a that is a portion of the first electrode plate 111 having no negative electrode active material layer formed thereon.

The first electrode uncoated portion 111a becomes a path for the flow of electric current between the first electrode plate 111 and the outside of the first electrode plate 111. However, embodiments of the present invention are not limited to the materials of the first electrode plate 111 disclosed herein.

The second electrode plate 112 may include a positive electrode active material layer coated on both surfaces of a positive electrode current collector formed of a highly conductive metal foil, such as an aluminum (Al) foil, for example. A chalcogenide compound may be used as a positive electrode active material of the positive electrode active material layer, and examples thereof may include composite metal oxides, such as $LiCoO_2$, $LiMn_2O_4$, $LiNiO_2$, $LiNi_{1-x}Co_xO_2$, ($0<x<1$), or $LiMnO_2$, but embodiments of the present invention are not limited to the materials of the active material of the positive electrode active material layer disclosed herein. In addition, the second electrode plate 112 includes a second electrode uncoated portion 112a that is a portion of the second electrode plate 112 having no positive electrode active material layer formed thereon.

The second electrode uncoated portion 112a becomes a path for the flow of electric current between the second electrode plate 112 and the outside of the second electrode plate 112. However, embodiments of the present invention are not limited to the materials of the second electrode plate 112 disclosed herein.

In one embodiment, polarities of the first electrode plate 111 and the second electrode plate 112 may be reversed. That is, the first electrode plate 111 may be a positive electrode, and the second electrode plate 112 may be a negative electrode.

The separator 113 prevents or reduces the likelihood of an electric short circuit between the first electrode plate 111 and the second electrode plate 112 and allows charges of the secondary battery, e.g., lithium ions, to move therebetween. The separator 113 may be made of a material selected from the group consisting of polyethylene, polypropylene, and a copolymer of polyethylene and polypropylene. However, embodiments of the present invention are not limited to the materials of the separator 113 disclosed herein. In one embodiment, the separator 113 preferably has a width larger than that of at least one of the first electrode plate 111 or the second electrode plate 112, which is advantageous in preventing or substantially preventing an electric short circuit from occurring between the first electrode plate 111 and the second electrode plate 112.

The first current collector plate 120 and the second current collector plate 150 to be electrically coupled to the first electrode plate 111 and the second electrode plate 112, respectively, are coupled to opposite ends of the electrode assembly 110. In one embodiment, the first current collector plate 120 and the second current collector plate 150 are coupled to the opposite ends of the electrode assembly 110 at the first electrode uncoated portion 111a and the second electrode uncoated portion 112a, respectively.

The electrode assembly 110 is accommodated in the case 170 together with an electrolyte. The electrolyte may include lithium salt, such as $LiPF_6$ or $LiBF_4$, dissolved in an organic solvent, such as ethylene carbonate (EC), propylene carbonate (PC), diethyl carbonate (DEC), ethyl methyl carbonate (EMC), or dimethyl carbonate (DMC). The electrolyte may exist in a liquid phase, a solid phase, or a gel phase.

The first current collector plate 120 may be made of a conductive material, such as a material selected from the group consisting of aluminum, copper, a copper alloy, and equivalents thereof.

The first current collector plate 120 makes contact with the first electrode uncoated portion 111a protruding to one end of the electrode assembly 110 to be electrically connected to the first electrode plate 111. The first current collector plate 120 includes a first electrode connection part 121 connected to the first electrode plate 111, a first terminal connection part 122 connected to the first terminal part 130, and a first connecting part 123 connecting the first electrode connection part 121 and the first terminal connection part 122. In one embodiment the first current collector plate 120 is formed as a single body. In one embodiment, the first current collector plate 120 has a corner C1 at which the first connecting part 123 is bent, such that it may be substantially formed in an inverted "L" (⌐) shape.

The first electrode connection part 121 makes contact with the first electrode uncoated portion 111a protruding to one end of the electrode assembly 110 to be electrically connected to the first electrode plate 111.

In one embodiment, the first electrode connection part 121 is welded to the first electrode uncoated portion 111a and is configured to vertically stand.

The first terminal connection part 122, in one embodiment, is welded to the first terminal part 130 and has a shape of a plate configured to lie in a substantially horizontal direction. The first terminal connection part 122 is installed between a cap plate 181 of the cap assembly 180 and the electrode assembly 110. A first fastening hole 122a is formed in the first terminal connection part 122 to pass through top and bottom surfaces of the first terminal connection part 122. A first electrode terminal 131 of the first terminal part 130 is fitted into and engaged with the first fastening hole 122a. The first fastening hole 122a may be sized to correspond to the first electrode terminal 131 so as to accommodate the first electrode terminal 131.

One side of the first connecting part 123 is connected to the first electrode connection part 121, and the other side of the first connecting part 123 is connected to the first terminal connection part 122. The first connecting part 123, in one embodiment, has the corner C1 bent between the one side and the other side thereof and may be substantially formed in an inverted "L" (⌐) shape.

The first terminal part 130 includes a first electrode terminal 131, a first terminal plate 132, and a fuse part 133.

The first electrode terminal 131, in one embodiment, passes through the cap plate 181 and upwardly extends and protrudes a length (e.g., a predetermined length). In addition, the first electrode terminal 131 is electrically connected to the first current collector plate 120 under the cap plate 181. While the first electrode terminal 131 upwardly extends and protrudes a length (e.g., a predetermined length) from the cap plate 181, a laterally extending flange 131a may be formed under the cap plate 181 to prevent or substantially prevent the first electrode terminal 131 from being dislodged from the cap plate 181. In one embodiment, a region of the first electrode terminal 131 formed below the flange 131a may be fitted into the first fastening hole 122a of the first current collector plate 120 to then be riveted or welded. In addition, a region of the first electrode terminal 131 formed above the flange 131a may pass through the cap plate 181 and upwardly extend and protrude a length (e.g., a predetermined length). A third region 132c of the first terminal plate 132, to be described further later, may be fixed to the extending and protruding region of the first electrode terminal 131.

The first terminal plate 132 is spaced apart from the cap plate 181 by an upper insulation member 184 and may be disposed to be substantially parallel with the cap plate 181.

The first terminal plate 132 is generally made of a conductive metal or an equivalent thereof and is electrically connected to the first electrode terminal 131.

The first terminal plate 132 may be divided into a first region 132a, a second region 132b, and the third region 132c by a first fuse 133a and a second fuse 133b of the fuse part 133 to be described further later.

The first region 132a is defined as a region from one end of the first terminal plate 132 to the first fuse 133a. Here, the first region 132a faces a first short-circuit hole 181b of the cap plate 181 and an inversion plate 189, to be described further later, and may cover upper portions of the first short-circuit hole 181b and the inversion plate 189.

The second region 132b of the first terminal plate 132 is defined as a region ranging from the first fuse 133a to the second fuse 133b. Here, the charging/discharging member 140 is electrically and physically connected to the second region 132b.

The third region 132c is defined as a region from the second fuse 133b to the other end of the first terminal plate 132. Here, the first electrode terminal 131 is electrically and physically connected to the third region 132c. In one embodiment, a first terminal hole 132d is formed in the third region 132c to allow an upper region of the first electrode terminal 131 to pass through the first terminal hole 132d. The first electrode terminal 131 upwardly protruding from the cap plate 181 may be fitted into the first terminal hole 132d to then be riveted or welded.

The fuse part 133 includes the first fuse 133a and the second fuss 133b. Regions where the first fuse 133a and the second fuse 133b are formed have smaller cross-sectional areas than other regions of the first terminal plate 132. Therefore, the regions where the first fuse 133a and the second fuse 133b are formed are melted by high heat generated when a high-current short circuit occurs in the secondary battery 100 and high current (e.g., 10,000 A or greater) Instantaneously flows, thereby performing a fuse function to cut off the flow of current.

Here, the high-current short circuit may be induced when the inversion plate 189 of the cap assembly 180 and the first terminal plate 132 make contact with each other by the heat generated due to overcharge of the secondary battery 100 and electrolyte decomposition and the internal pressure exceeding a reference pressure (e.g., a preset pressure). The high-current short circuit may also be induced when the second terminal part 160 and a side of the first terminal plate 132 make direct contact with each other by the secondary battery 100 being compressed, such as in the Y-axis direction. The high-current short circuit may also be induced when the cap plate 131 and a bottom surface of the first terminal plate 132 are brought into direct contact with each other by the secondary battery 100 being compressed, such as in the Z-axis direction. That is, since a region where the fuse part 133 is formed is melted due to the high-current short circuit to cut off the flow of current, charging or discharging of the secondary battery 100 may be stopped before a danger of ignition or explosion is generated.

The charging/discharging member 140 may be made of a conductive material selected from the group consisting of aluminum, copper, a copper alloy, and equivalents thereof and may have a shape of a plate or a wire, but embodiments of the present invention are not limited to the materials and shape of the charging/discharging member 140 disclosed herein.

The charging/discharging member 140 is electrically and physically connected to the second region 132b of the first terminal plate 132. That is, the charging/discharging member 140 is disposed between the first fuse 133a and the second fuse 133b. Here, the charging/discharging member 140 may provide a path of charge/discharge current (1) when the secondary battery 100 and an external device (not shown) are charged and discharged.

The second current collector plate 150 includes a second electrode connection part 151 connected to the second electrode plate 112, a second terminal connection part 152 connected to the second terminal part 160, and a second connecting part 153 connecting the second electrode connection part 151 and the second terminal connection part 152. In one embodiment, the second current collector plate 150 is formed as a single body. In one embodiment, the second current collector plate 150 has a corner C2 at which the second connecting part 153 is bent, such that it may be substantially formed in an inverted "L" (⌐) shape. The second current collector plate 150 may be made of a conductive material, such as a material selected from the group consisting of aluminum, and equivalents thereof.

The second electrode connection part 151 makes contact with the second electrode uncoated portion 112a protruding to one end of the electrode assembly 110 to be electrically connected to the second electrode plate 112. In one embodiment, the second electrode connection part 151 is welded to the second electrode uncoated portion 112a and is configured to vertically stand.

The second terminal connection part 152, in one embodiment, is welded to the second terminal part 160 and has a shape of a plate configured to lie in a substantially horizontal direction. The second terminal connection part 152 is installed between the cap plate 181 of the cap assembly 180 and the electrode assembly 110.

A second fastening hole 152a is formed in the second terminal connection part 152 to pass through top and bottom surfaces of the second terminal connection part 152. A second electrode terminal 161 of the second terminal part 160 is fitted into and engaged with the second fastening hole 152a. The second fastening hole 152a may be sized to correspond to the second electrode terminal 161 so as to accommodate the second electrode terminal 161.

One side of the second connecting part 153 is connected to the second electrode connection part 151, and the other side of the second connecting part 153 is connected to the second terminal connection part 152. The second connecting part 153, in one embodiment, has the corner C2 bent between the one side and the other side thereof and may be substantially formed in an inverted "L" (⌐) shape.

The second terminal part 160 is generally made of a metal or an equivalent thereof and is electrically connected to the second current collector plate 150. In addition, the second terminal part 160 may be electrically connected to the cap plate 181. The second terminal part 160 includes the second electrode terminal 161 accommodated in the second fastening hole 152a of the second current collector plate 150 and a second terminal plate 162 coupled to the second electrode terminal 161.

The second electrode terminal 161, in one embodiment, passes through the cap plate 181 and upwardly extends and protrudes a length (e.g., a predetermined length). In addition, the second electrode terminal 161 is electrically connected to the second current collector plate 150 under the cap plate 181. While the second electrode terminal 181 upwardly extends and protrudes a length (e.g., a predetermined length) from the cap plate 181, a laterally extending flange 161a may be formed under the cap plate 181 to prevent or substantially prevent the second electrode terminal 161 from being dislodged from the cap plate 181. In one embodiment, a region of the second electrode terminal 181 formed below the flange 161a may be fitted into the second fastening hole 152a of the second current collector plate 150 to then be riveted or welded. In addition, a region of the second electrode terminal 161 formed above the flange 161a may pass through the cap plate 181 and upwardly extend and protrude a length (e.g., a predetermined length). The second terminal plate 182 may be fixed to the extending and protruding region of the second electrode terminal 161.

The second terminal plate 182 has a shape of a plate including a second terminal hole 162a passing through top and bottom surfaces of the second terminal plate 162. The second terminal hole 162a of the second terminal plate 162 may be sized and shaped to correspond to the second electrode terminal 181 so as to accommodate the second electrode terminal 181. The second electrode terminal 161 upwardly protruding from the cap plate 181 may be fitted/into the second terminal hole 162a of the second terminal plate 162 to then be riveted or welded.

The case 170 may be made of a conductive metal such as aluminum, an aluminum alloy, or nickel-plated steel, and may have a substantially hexahedral shape with a top opening 171 through which the electrode assembly 110, the first current collector plate 120, and the second current collector plate 150 are placed. Since the case 170 and the cap assembly 180 assembled with each other are illustrated in FIGS. 1 and 2, the top opening 171 is not specifically shown but a peripheral portion of the cap assembly 180 may be placed in the top opening 171 in one embodiment, the interior surface of the case 170 is treated with an insulation process to be insulated from the electrode assembly 110, the first current collector plate 120, the second current collector plate 150 and the cap assembly 180.

The cap assembly 180 is coupled to the case 170. Specifically, the cap assembly 180 includes the cap plate 181, seal gaskets 183 and 187, a safety vent 182, upper insulation members 184 and 186, lower insulation members 185 and 188, and the inversion plate 189.

The cap plate 181 may seal the top opening 171 of the case 170 and may be made of the same material as the case 170. For example, in one embodiment, the cap plate 181 may be coupled to the case 170 by laser welding. The cap plate 181 may be electrically connected to the second terminal part 160, such that the cap plate 181 has a same polarity as the second terminal part 160. Accordingly, the cap plate 181 and the case 170 may have the same polarity. The cap plate 181 includes a vent hole 181a and a first short-circuit hole 181b passing through top and bottom surfaces of the cap plate 181. Here, the first short-circuit hole 181b is positioned under the first terminal plate 132.

The seal gaskets 183 and 187, made of an insulating material, include a first seal gasket 183 formed between the first electrode terminal 131 and the cap plate 181, and a second seal gasket 187 formed between the second electrode terminal 161 and the cap plate 181, and may seal portions between each of the first electrode terminal 131 and the second electrode terminal 161 and the cap plate 181. The first seal gasket 183 and the second seal gasket 187 may prevent or substantially prevent external moisture from penetrating into the case 170 and may prevent or substantially prevent an electrolyte accommodated in the case 170 from flowing out.

The safety vent 182 may be installed in the vent hole 181a of the cap plate 181 and may have a notch formed to be opened at a reference pressure (e.g., a preset pressure).

The upper insulation members 184 and 186 include a first upper insulation member 184 disposed between the first terminal plate 132 and the cap plate 181, and a second upper insulation member 186 disposed between the second terminal plate 162 and the cap plate 181.

The first upper insulation member 184 electrically insulates the first terminal plate 132 and the cap plate 181 from each other and is brought into close contact with the first terminal plate 132 and the cap plate 181. In addition, the first upper insulation member 184 may also be brought into close contact with the first seal gasket 183.

In one embodiment the first upper insulation member 184 includes a second short-circuit hole 184a so as to correspond to the first short-circuit hole 181b of the cap plate 181. Accordingly, when the inversion plate 189 is upwardly inverted, it may be brought into direct contact with the region 132a of the first terminal plate 132 without being insulated by the first upper insulation member 184.

The second upper insulation member 186 may be disposed between the second terminal plate 162 and the cap plate 181. However, a portion of the second terminal plate 162 may be brought into contact with the cap plate 181 to be electrically connected with the cap plate 181.

The lower insulation members 185 and 188 include a first lower insulation member 185 arranged between the first current collector plate 120 and the cap plate 181, and a second lower insulation member 188 arranged between the second current collector plate 150 and the cap plate 181.

The first lower insulation member 185 and the second lower insulation member 188 prevent or substantially prevent unnecessary electric short circuits from occurring between each of the first current collector plate 120 and the second current collector plate 150 and the cap plate 181. That is, the first lower insulation member 185 and the second lower insulation member 188 may prevent or substantially prevent a short circuit from occurring between the first current collector plate 120 and the cap plate 181 and may prevent or substantially prevent a short circuit from occurring between the second current collector plate 150 and the cap plate 181. In addition, since the first lower insulation member 185 and the second lower insulation member 188 are also formed between each of the first electrode terminal 131 and the second electrode terminal 161 and the cap plate 181, they may also prevent or substantially prevent unnecessary electric short circuits from occurring between each of the first electrode terminal 131 and the second electrode terminal 161 and the cap plate 181.

The inversion plate 189 is disposed in the first short-circuit hole 181b of the cap plate 181 and is covered by the first region 132a of the first terminal plate 132. In one embodiment, the inversion plate 189 has a downwardly convex round part 189a and an edge part 189b fixed to the cap plate 181. The inversion plate 189 and the cap plate 181 have the same polarity.

Referring to FIG. 5, when the internal pressure exceeds a reference pressure (e.g., a preset pressure) due to overcharging of the secondary battery 100, the inversion plate 189 may be inverted to then upwardly convexly protrude.

In this case, the round part 189a of the inversion plate 189 makes contact with the first region 132a of the first terminal plate 132 and a short-circuit current (SI) may flow through a contact region between the round part 189a and the first region 132a.

That is, as illustrated in FIG. 5, when the internal pressure exceeds a reference pressure (e.g., a preset pressure) due to overcharging of the secondary battery 100 according to an embodiment of the present invention, the inversion plate 189 may be upwardly convexly inverted to then be brought into contact with the first region 132a of the first terminal plate 132, thereby inducing a short circuit. Accordingly, short-circuit current (SI) may flow from the first electrode plate 111 to the second electrode plate 112 through the cap plate 181.

In addition, referring to FIGS. 6 to 8, the short-circuit current (SI) flowing through the first terminal plate 132 may flow through the first fuse 133a and the second fuse 133b formed at opposite sides of the charging/discharging member 140, and electric resistance may concentrate on the first fuse 133a and the second fuse 133b having smaller cross-sectional areas than other regions of the first terminal plate 132. Therefore, the first fuse 133a and the second fuse 133b may be concurrently (e.g., simultaneously) melted by the heat generated when the short-circuit current (SI) is high, thereby functioning as a fuse (F) that cuts off the flow of current.

That is, the first fuse 133a and the second fuse 133b may be concurrently (e.g., simultaneously) melted, such that the short-circuit current (SI) flowing in the first terminal plate 132 and the cap plate 181 is cut off. In addition, charging/discharging current (I) flowing in an external device (not shown) through the charging/discharging member 140 may also be cut off.

In one embodiment, where a high-output, large-capacity battery pack is formed by a plurality of secondary batteries 100 connected to each other in series, in parallel, or in series/parallel, the first fuse 133a, the second fuse 133b and the inversion plate 189 of each of the plurality of secondary batteries 100 or the secondary battery 100 disposed at an end of the battery pack are operated, thereby completely cutting off charge/discharge paths of the battery pack.

While the secondary battery of the present invention has been particularly shown and described with reference to some exemplary embodiments thereof, it will be understood by those of ordinary skill in the art that various changes in form and details may be made therein without departing from the spirit and scope of the present invention as defined by the following claims and equivalents thereof.

What is claimed is:

1. A secondary battery comprising:
an electrode assembly including a first electrode plate, a second electrode plate and a separator between the first electrode plate and the second electrode plate;
a case accommodating the electrode assembly and having an opening;
a cap plate sealing the opening of the case, the cap plate electrically connected to the second electrode plate and having a short-circuit hole;
an inversion plate arranged in the short-circuit hole;
a first terminal plate electrically connected to the first electrode plate and spaced apart from the cap plate;
a fuse part comprising a first fuse and a second fuse spaced apart from each other in the first terminal plate; and
a charging/discharging member electrically and physically connected to the first terminal plate between the first fuse and the second fuse at an outside of the case,
wherein the first fuse and the second fuse are configured to be melted in a short-circuited state between the first electrode plate and the second electrode plate such that the charging/discharging member is electrically disconnected from each of the first electrode plate and the second electrode plate.

2. The secondary battery of claim 1, further comprising a first electrode terminal protruding to an upper portion of the cap plate and electrically connecting the first electrode plate and the first terminal plate.

3. The secondary battery of claim 2, wherein the first terminal plate comprises a first region extending from one end of the first terminal plate to the first fuse; a second region extending from the first fuse to the second fuse; and a third region extending from the second fuse to an end of the first terminal plate opposite the one end.

4. The secondary battery of claim 3, wherein the first region of the first terminal plate faces the inversion plate, the second region of the first terminal plate is connected to the charging/discharging member, and the third region of the first terminal plate is connected to the first electrode terminal.

5. The secondary battery of claim 1, further comprising an insulation member between the first terminal plate and the cap plate, the insulation member electrically insulating the cap plate from the first terminal plate.

6. The secondary battery of claim 5, wherein when an internal pressure of the case is greater than a reference pressure, the inversion plate is inverted and makes contact with the first terminal plate to generate a short-circuit current.

7. The secondary battery of claim 6, wherein the inversion plate comprises a round part convexly arranged toward the electrode assembly when the internal pressure is less than the reference pressure, and an edge part fixed to the cap plate.

8. The secondary battery of claim 1, further comprising a second electrode terminal electrically connected to the second electrode plate and protruding to the upper portion of the cap plate.

9. The secondary battery of claim 8, further comprising:
a first current collector plate electrically connecting the first electrode plate and the first electrode terminal; and
a second current collector plate electrically connecting the second electrode plate and the second electrode terminal.

10. The secondary battery of claim 1, wherein the first fuse and the second fuse have smaller cross-sectional areas than other regions of the first terminal plate.

* * * * *